3,313,103
GAS TURBINE COMBUSTION PROCESS
Douglas Johnson, Indianapolis, Ind., assignor to General Motors Corporation, Detroit, Mich., a corporation of Delaware
Filed Aug. 25, 1965, Ser. No. 482,521
8 Claims. (Cl. 60—39.06)

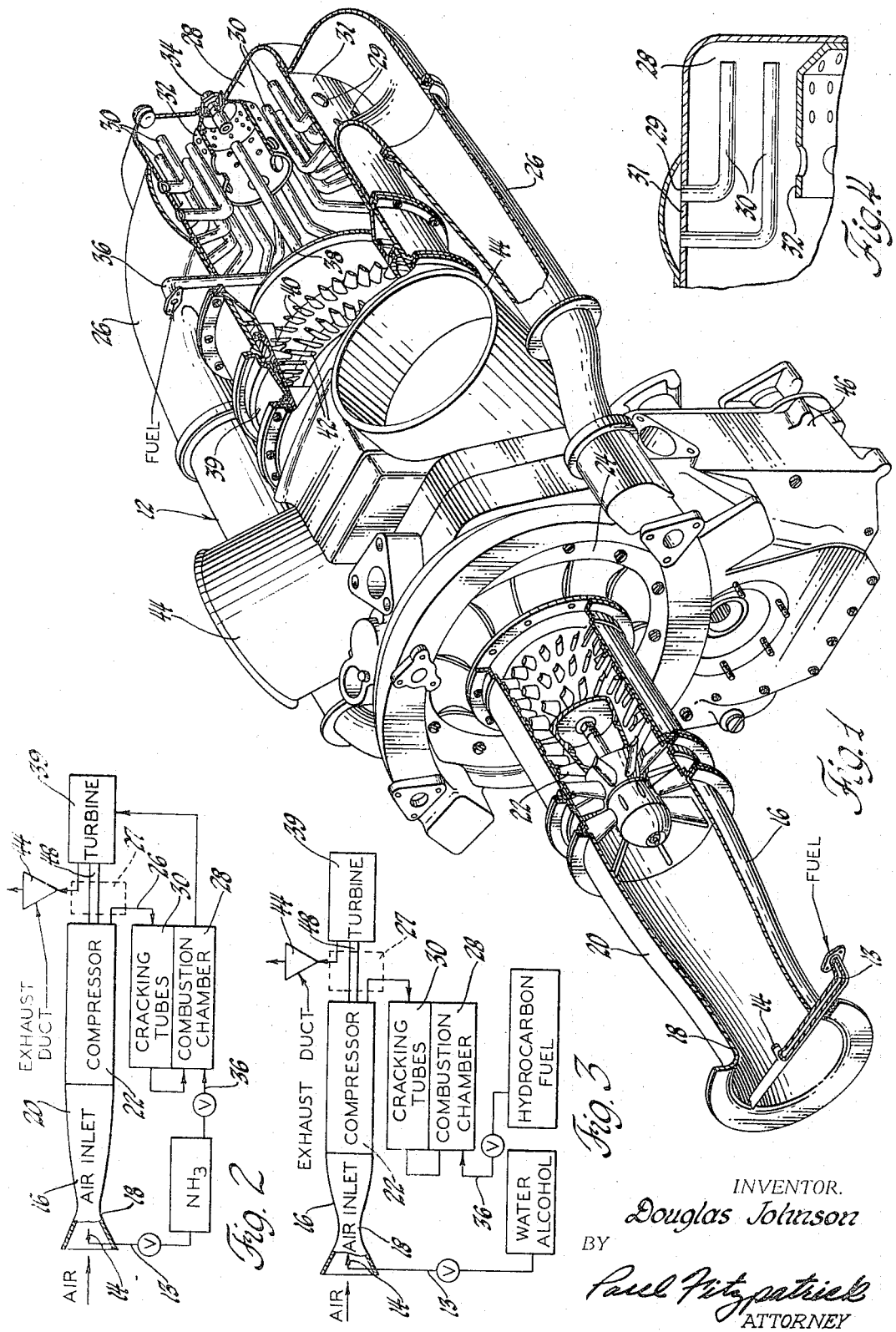

My invention relates to the operation of gas turbine engines in general and more specifically to the method of operation of a gas turbine engine utilizing ammonia as a fuel.

Logistics or the art of supply has been a continuous and plaguing problem to the military, especially during wartime. Under the energy depot concept, the military has deviced a system to eliminate some of the perils associated with lack of supplies during wartime emergencies. Under this concept, all power equipment is to be operable on fuels capable of "on site" manufacture, thereby insuring continued operation of the power equipment under all conditions. This emergency operation using "on site" fuel is also to be possible with a miniumum of change to the conventional operational configuration of the power equipment.

Ammonia is a substance capable of "on site" manufacture from the life sustaining elements of air and water. Ammonia, however, is not commonly thought of as a fuel because of its low heating value and poor flame stability characteristics. Heretofore, attempts have been made to operate conventional piston cylinder type engines on ammonia as a fuel with some moderate success. However, to date, no attempt has been made to operate a gas turbine engine on ammonia fuel. Since aircraft and various ground support equipment are run by gas turbine engines which under the energy depot concept must be operable on fuels manufacturable "on site," it is an object of my invention to provide a combustion process based upon ammonia as a fuel which is capable of being carried out by a gas turbine engine.

Another object is to provide a combustion process based upon ammonia as fuel which is capable of being carried out by a gas turbine engine having minimum engine modifications from its conventional configuration operable on hydrocarbon fuels.

These and other objects will become more readily apparent by reference to the following specification taken in conjunction with the annexed drawings wherein:

FIGURE 1 is a perspective view of a partially cut away gas turbine engine which is capable of carrying out the combustion process in accordance with my invention.

FIGURE 2 is a schematic of the gas turbine engine of FIGURE 1 showing the steps of the ammonia combustion process in accordance with my invention.

FIGURE 3 is a schematic of the gas turbine engine of FIGURE 1 showing its operation on the conventional hydrocarbon fuel.

FIGURE 4 is a view of a portion of FIGURE 1 showing the relationship of the J-tubes to the combustor.

Referring now to FIGURE 1, a gas turbine engine is indicated generally at 12. A controlled fuel supply source (not shown) is connected through a supply conduit 13 to a fuel nozzle 14 which is mounted in an air inlet 16. The air inlet 16 is in the shape of a convergent-divergent nozzle. The fuel nozzle 14 is located just upstream of the nozzle throat 18 which is spaced from a conventional multi-stage axial compressor 22 by the divergent section or diffuser 20 of the nozzle. A radial outlet 24 connects the compressor 22 with a pair of axial ducts 26 which in turn lead to the combustion chamber 28 through a plurality of J-shaped tubes 30. The J-tubes 30 are mounted in apertures 29 in liner 31 which is disposed between the ducts 26 and the combustor 28. Thus all the gases flowing through the ducts 26 are directed into the combustor 28 through the J-tubes 30. The combustor 28 has an apertured central pilot combustion chamber 32 with an igniter 34 mounted at its center. A second fuel supply tube 36 has its outlet 38 disposed in the pilot combustor 32 adjacent the igniter 34. The pilot combustor 32 exhausts into the combustion chamber 28 which in turn leads to the turbine section 39 where high pressure and low pressure turbines 40 and 42, respectively remove energy from the exhaust gases to independently drive the compressor 22 and the gear box 46 through concentric relatively rotatable shafts (not shown). The drive shaft for the compressor, however, is shown schematically in FIGURE 2 at 48. From the turbine section 39, the gases travel out the exhaust ports 44.

The method of operating the gas turbine 12 on ammonia fuel will now be explained in reference to FIGURE 2. The ammonia fuel supply is contained under pressure in an anhydrous liquid state and delivered under pressure to the inlet nozzle 14 where it is sprayed into the inlet 16 substantially at throat 18. The ammonia fuel is a gas at standard day pressure and temperature so when the ammonia is sprayed into the air inlet and its pressure is reduced to a level near ambient, the liquid ammonia evaporates into gaseous ammonia. The evaporation of the ammonia at the throat by the air stream is a cooling action which reduces the velocity and changes the momentum of the stream. The change of momentum in turn causes an increased pressure following the throat. Thus the introduction of the ammonia at the inlet in a high velocity air stream causes a momentum pressure rise due to the cooling action. The ammonia which was introduced and vaporized at the throat is then well mixed with air upon entering divergent diffuser 20 with the ratio of the evaporated ammonia and air being such so as to provide a lean combustible mixture. The throat area 18 is designed to provide the highest velocity consistent with the associated friction losses such that the momentum pressure rise will show a substantial net gain in useable total pressure. The length and area ratio of the diffuser is chosen so that the intermingled fuel and air is diffused to return the flow velocity to a desired compressor inlet Mach number with minimum friction losses.

In the meantime, the anhydrous liquid ammonia from the fuel supply has also been delivered through the pilot supply tube 36 and out outlet 38 into the pilot combustion chamber 32. The apertures in the pilot combustor 32 are designed to limit the supply of air available within the pilot combustor so that the ammonia delivered out of tube 36 can be mixed in stoichiometric proportion of the air in the pilot combustor 32. The igniter 34 ignites the stoichiometric mixture of ammonia and air causing it to burn. After the process has started and equilibrium has been reached, the heat from the combustion of the ammonia in the pilot combustor 32 is sufficient to partially crack the ammonia in the tube 36 in the vicinity of the outlet 38. With the gaseous partially cracked ammonia then being fed to the pilot combustion chamber 32 in a stoichiometric proportion to air therein, a high energy level, stable combustion is continuously provided within the pilot chamber 32.

Returning to our lean combustible mixture in the inlet 16, it is delivered to the compressor 22 where it is compressed, after which it flows through the axial ducts 26 and into the J-shaped tubes 30. The J-tubes 30 are disposed in the main combustor 28 and lie in a relatively hot region adjacent the pilot combustor 32 so that the ammonia burns upon egress from the J-shaped tubes 30. Again, after the engine operation reaches equilibrium, there is sufficient heat in this region of the main combustion chamber 28 in which the J-tubes 30 are disposed to crack a portion of the evaporated ammonia within the J-tubes 30 into the dissociation products ammonia. The amount of ammonia which will be cracked will depend upon the length of the tubes and the energy level of the combustion taking place in the main combustor 28. In addition, a regenerator 27 (FIG. 2) may be provided to transfer heat from the exhaust gases to the lean combustible mixture after it has been compressed and prior to its reaching the J-tubes 30. With the regenerator 27, an increased amount of ammonia may be cracked with a given configuration or, in the alternative, either the combustion energy level or the J-tube length could be decreased to give the same amount of cracking. Another feasible possibility of increasing the amount of ammonia being cracked is the use of a catalyst. A non-limiting example would be platinum which could be embedded in bands which could be inserted into the J-tubes 30. I have found that the flame stability limits improve with increased cracking of ammonia and that these limits approach those of conventional hydrocarbon fuels when about 28% of the ammonia is cracked prior to introduction into the main combustor 28. Thus with about 28% cracking, a conventional gas turbine configuration is capable of operation on ammonia fuel without any modification other than those required for the ammonia supply system.

The evaporated ammonia and dissociation products of ammonia when delivered into the region of the combustion chamber 28 adjacent the pilot chamber 32 are burned. The combustion products of this mixture as well as those of the stoichiometric mixture in the pilot combustor 32 are then expanded through the turbine section 39 and out the exhaust ports 44. Of course, where a regenerator 27 is utilized, the combustion products will flow through the regenerator to transfer heat to the compressed lean ammonia-air mixture before being exhausted.

One of the interesting things to note is the closed regeneration of energy which occurs within the main combustor 28. The lean combustible mixture comprising gaseous and cracked ammonia is delivered out of the end of the J-tubes 30 where the mixture is burned at a sufficiently high energy level to support stable combustion of ammonia. As the combustion gases move toward the turbine section 39, heat is transferred from the combustion gases to the ammonia in the J-tubes to dissociate a portion of it so that it will subsequently support high energy level combustion as it egresses from the J-tubes 30. In addition, this transferred heat reduces the energy level and, consequently, the temperature of the combustion gases to a level feasible for operation with present turbine designs. Thus, this cycle within a cycle comprises transferring energy to the ammonia in the J-tubes to dissociate a portion of it so as to enable the ammonia to be burned at a sufficiently high energy level to support stable combustion and then immediately removing a portion of the energy to reduce the gases to suitable turbine operating temperatures while utilizing the removed energy to crack the ammonia in the J-tubes and transfer energy to it.

In addition to this feature of the process, it should also be noted that the evaporation of the main fuel supply of ammonia in the air inlet 16 cools the ambient air giving the gas turbine the advantages of operating in a "cool day." The addition of the ammonia also causes a momentum pressure rise in the diffuser 20. The reduction of temperature and increased pressure at the compressor inlet increases flow rate through the compressor, thereby increasing power output.

In addition to the above methods of operation, I have also found that the engine may be operated, although less efficiently, with little or no cracking of the ammonia prior to its introduction into the main combustor 28. Also rather than cracking the ammonia prior to its introduction into the main combustor, it is also possible to provide additives such as hydrazine or acetylene. In such cases, a hydrazine enriched or acetylene enriched ammonia-air mixture will be introduced into the combustor. Also it would be quite possible to maintain the combustion in the main combustor 28 at a sufficiently high energy level to support the stable combustion without the use of a pilot burner. In such cases, however, the combustor would have to be enlarged as a compensation for the absence of the stoichiometric combustion zone.

FIGURE 3 shows the operation of the gas turbine of FIGURE 1 with a conventional hydrocarbon fuel. In this case, the hydrocarbon fuel is supplied through the tube 36 into the pilot combustor 32. A water-alcohol mixture is introduced into the air inlet 16 to provide increased air flow through the compressor 22. The compressed air-alcohol mixture may or may not then be preheated in the regenerator 27 before flowing into the combustor 28 through the J-shaped tubes 30. A portion of the air-alcohol mixture is combined with the hydrocarbon fuel and burned. The remainder is secondary air which mixes with the combustion products and is expanded out the turbine section 39 and exhaust ducts 44 in the conventional manner.

Thus it can be seen that I have invented a combustion process based upon ammonia as fuel which is capable of being carried out by a gas turbine engine which is also operable on a hydrocarbon fuel.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention.

I claim:
1. In the operation of a gas turbine engine comprising in serial relationship an inlet zone, a compression zone, a cracking zone, a combustion zone, a turbine zone, and an exhaust zone, the steps of:
  introducing ammonia into the inlet zone,
  mixing the ammonia in the inlet zone with air to form a combustible mixture,
  compressing the combustible mixture,
  cracking a portion of the ammonia in the combustible mixture into the dissociation products of ammonia,
  burning the combustible mixture and cracked portion of ammonia in the combustion zone, and
  expanding the combustion products of the combustible mixture, and the cracked ammonia through the turbine and exhaust zones to extract energy from the combustion products.

2. In the operation of a gas turbine engine comprising in serial relationship an inlet zone, a compression zone, a combustion zone including a pilot combustion zone, a turbine zone, and an exhaust zone, the steps of:
  simultaneously introducing ammonia into the inlet zone and the pilot combustion zone,
  mixing the ammonia in the inlet zone with air to form a lean combustible mixture while combining the ammonia in the pilot combustion zone with air in a stoichiometric proportion and igniting the same to provide continuous stable combustion therein,
compressing the lean combustible mixture,
introducing the combustible mixture into the combustion zone in an area adjacent the pilot combustion zone to burn the lean mixture, and
expanding the combustion products of the stoichiometric mixture and the lean combustible mixture through the turbine and exhaust zones to extract energy from the combustion products.

3. In the operation of a gas turbine engine comprising in serial relationship an inlet zone, a compression zone, a cracking zone, a combustion zone including a pilot combustion zone, a turbine zone, and an exhaust zone, the steps of:
simultaneously introducing ammonia into the inlet zone and the pilot combustion zone,
mixing the ammonia in the inlet zone with air to form a lean combustible mixture while combining the ammonia in the pilot combustion zone with air in a stoichiometric proportion and igniting the same to provide continuous stable combustion therein,
compressing the lean combustible mixture,
cracking a portion of the ammonia in the lean combustible mixture into the dissociation products of ammonia,
introducing the lean combustible mixture and dissociated products of ammonia into the combustion zone in an area adjacent the pilot combustion zone to burn the lean mixture and cracked portion, and
passing the combustion products of the stoichiometric mixture, the lean combustible mixture, and the cracked ammonia through the turbine and exhaust zones to extract energy from the combustion products.

4. In the operation of a gas turbine engine comprising in serial relationship an inlet zone, a compression zone, a cracking zone, a combustion zone including a pilot combustion zone, a turbine zone and an exhaust zone, the steps of:
simultaneously introducing ammonia into the inlet zone and the pilot combustion zone,
mixing the ammonia in the inlet zone with air to form a lean combustible mixture while combining the ammonia in the pilot combustion zone with air in a stoichiometric proportion and igniting the same to provide continuous stable combustion therein,
compressing the lean combustible mixture,
heating the lean combustible mixture to crack a portion of the ammonia therein into the dissociation products of ammonia,
introducing the lean combustible mixture and dissociated products of ammonia into the combustion zone in an area adjacent the pilot combustion zone to burn the lean mixture and cracked portion, and
passing the combustion products of the stoichiometric mixture, the lean combustible mixture, and the cracked ammonia through the turbine and exhaust zones to extract energy from the combustion products.

5. In the operation of a gas turbine engine comprising in serial relationship an inlet zone including a throat and divergent diffuser, a compression zone, a cracking zone, a combustion zone including a pilot combustion zone with a discrete fuel supply, a turbine zone, and an exhaust zone, the steps of:
simultaneously introducing anhydrous liquid ammonia into the inlet zone upstream of the throat and into the pilot combustion zone fuel supply,
evaporating the ammonia in the inlet zone substantially at the throat while vaporizing the liquid ammonia which is in the discrete fuel supply in the area adjacent the pilot combustion zone,
mixing the evaporated ammonia and air in the diffuser to form a lean combustible mixture while combining the vaporized ammonia in the pilot combustion zone with air in a stoichiometric proportion and igniting the same to provide a continuous stable combustion in the pilot combustion zone,
compressing the lean combustible mixture,
passing the compressed lean combustible mixture adjacent the combustion zone to crack a portion of the ammonia into the dissociation products of ammonia,
introducing the lean combustible mixture and cracked portion of ammonia into the combustion zone adjacent the pilot combustion zone to burn the lean mixture and cracked portion, and
expanding the combustion products of the stoichiometric mixture, the lean combustible mixture, and the cracked ammonia through the turbine and exhaust zones to extract energy from the combustion products.

6. In the operation of a gas turbine engine comprising in serial relationship an inlet zone including a throat and divergent diffuser, a compression zone, a cracking zone, a combustion zone including a pilot combustion zone with a discrete fuel supply, a turbine zone, and an exhaust zone, the steps of:
simultaneously introducing anhydrous liquid ammonia into the inlet zone upstream of the venturi throat and into the pilot combustion zone fuel supply,
evaporating the ammonia in the inlet zone substantially at the venturi throat while vaporizing the liquid ammonia and cracking a portion thereof into the dissociation products of ammonia in the area of the discrete fuel supply in the area adjacent the pilot combustion zone,
mixing the evaporated ammonia and air in the diffuser to form a lean combustible mixture while combining the vaporized partially cracked ammonia in the pilot combustion zone with air in a stoichiometric proportion and igniting the same to provide a continuous stable combustion in the pilot combustion zone,
compressing the lean combustible mixture,
heating the compressed lean combustible mixture,
passing the compressed lean combustible mixture adjacent the combustion zone to crack a portion of the ammonia into the dissociation products of ammonia,
introducing the lean combustible mixture, and cracked ammonia into the combustion zone adjacent the pilot combustion zone to burn the lean mixture and cracked portion, and
expanding the combustion products of the stoichiometric mixture, the lean combustible mixture, and the cracked ammonia through the turbine and exhaust zones to extract energy from the combustion products.

7. The method of operating a gas turbine as described in claim 6 wherein the portion of ammonia is cracked as the compressed lean combustible mixture is passed adjacent the combustion zone is approximately 28%.

8. In the operation of a gas turbine engine comprising in serial relationship an inlet zone including a throat and a divergent diffuser, a compression zone, a cracking zone, a combustion zone including a pilot combustion zone with a discrete fuel supply, a turbine zone, and an exhaust zone, the steps of:
simultaneously introducing anhydrous liquid ammonia into the inlet zone upstream of the venturi throat and into the pilot combustion zone fuel supply,
evaporating the ammonia in the inlet zone substantially at the venturi throat while vaporizing the liquid ammonia which is in the discrete fuel supply in the area adjacent the pilot combustion zone,
mixing the evaporated ammonia and air in the diffuser to form a lean combustible mixture while combining the vaporized ammonia in the pilot combustion zone with air in a stoichiometric proportion and igniting the same to provide a continuous stable combustion in the pilot combustion zone,
compressing the lean combustible mixture, heating the compressed lean combustible mixture to crack a portion of the ammonia into the dissociation products of ammonia, introducing the lean combustible mixture and cracked portion of ammonia into the combustion zone adjacent the pilot combustion zone to burn the lean mixture and cracked portion, and expanding the combustion products of the stoichiometric mixture, the lean combustible mixture, and the cracked ammonia through the turbine and exhaust zones to extract energy from the combustion products.

References Cited by the Examiner

UNITED STATES PATENTS

| | | | |
|---|---|---|---|
| 2,826,038 | 3/1958 | Shannon | 60—39.46 |
| 2,987,873 | 6/1961 | Fox | 60—39.46 X |

MARK NEWMAN, *Primary Examiner.*

RALPH D. BLAKESLEE, *Examiner.*